United States Patent [19]

Baek

[11] Patent Number: 5,481,942
[45] Date of Patent: Jan. 9, 1996

[54] CRANKSHAFT OF V-TYPE 6-CYLINDER INTERNAL COMBUSTION ENGINE

[75] Inventor: Sungyoon Baek, Suwon, Rep. of Korea

[73] Assignee: Hyundai Motor Company, Seoul, Rep. of Korea

[21] Appl. No.: 83,569

[22] Filed: Jun. 30, 1993

[30] Foreign Application Priority Data

Dec. 30, 1991 [KR] Rep. of Korea .................. 91-25216
Dec. 30, 1991 [KR] Rep. of Korea .................. 91-25217

[51] Int. Cl.⁶ .................. F02B 75/06; F16C 3/04
[52] U.S. Cl. .................. 74/603; 74/595; 74/596; 74/597; 74/598; 74/604; 123/192.2
[58] Field of Search .................. 74/603, 604, 595, 74/596, 597, 598; 123/192.1, 192.2

[56] References Cited

U.S. PATENT DOCUMENTS

| | | | |
|---|---|---|---|
| 2,680,387 | 6/1954 | White et al. | 74/603 |
| 3,538,788 | 11/1970 | Patchen | 74/603 |
| 4,046,028 | 9/1977 | Vachris . | |
| 4,517,933 | 5/1985 | Yasutake . | |
| 4,552,104 | 11/1985 | Hara et al. . | |
| 4,730,512 | 3/1988 | Ito et al. . | |
| 4,787,342 | 11/1988 | Matsumori et al. . | |
| 5,000,141 | 3/1991 | Sugano | 123/192.2 |

FOREIGN PATENT DOCUMENTS 60-227037 11/1985 Japan .

Primary Examiner—Charles A. Marmor
Assistant Examiner—Troy Grabow
Attorney, Agent, or Firm—Birch, Stewart, Kolasch & Birch

[57] ABSTRACT

A crankshaft of a V-type 6-cylinder internal combustion engine including first to sixth crank pins connected with connecting rods, having first to fourth crank journals between the first to sixth crank pins, and first to ninth crank arms between first to sixth crank pins and the first to fourth crank journals, the combination including a first balance weight provided to the first crank arm, a center of gravity of the first balance weight being mal-distributed to a lower part with respect to a center axis of the crankshaft, a second balance weight provided to the second crank arm, a center of gravity of the second balance weight being mal-distributed to a lower part, and deviated from the first balance weight in a counterclockwise direction, third and fourth balance weights provided respectively to the fourth crank arm and sixth crank arm, the centers of gravity of the third and fourth balance weights being mal-distributed to be orthogonal to the center of gravity of the first balance weight in a clockwise direction, a fifth balance weight provided on the eighth crank arm, the center of gravity of the fifth balance weight being mal-distributed to be in vertical symmetry with the second balance weight, and a sixth balance weight provided to the ninth crank arm, the center of gravity of the sixth balance weight being mal-distributed to be in vertical symmetry with the first balance weight.

4 Claims, 10 Drawing Sheets

CRANKSHAFT OF V-TYPE 6-CYLINDER INTERNAL COMBUSTION ENGINE

BACKGROUND OF THE INVENTION

1. Field of the Invention

The present invention relates to a crankshaft of a type 6-cylinder combustion engine having four crank journals.

2. Description of Related Art

A crankshaft has an important function of producing dynamics by changing rectilinear motion generated by pistons of each cylinder into rotational motion, and, at the same time, applying force with the pistons that reach a bottom dead point to generate the rectilinear motion successively. The crankshaft should be able to rotate substantially without vibration, since the center of crank journals and crank pins are eccentric to each other, and the crankshaft cannot normally maintain a balance.

In order to solve such a problem, balance weights are generally provided to crank arms opposite to the crank pins to maintain balance during the rotation of the crankshaft.

While the balance weights used in a small-sized engine are formed integrally with the crank arms, those in a large-sized engine are made separately and attached to crank arms.

The balance weights are aligned in a symmetrical direction to offset inertia couple. Since the development angle of the crank arms in a series 4-internal combustion engine usually has 180 degrees, there is no problem in the disposition of the balance weights. In the case of the V-type 6-cylinder internal combustion engine, however, it is hard to position the balance weights. Because the weight of the crankshaft is excessively heavy, if the balance weights are provided to all the crank arms, torsional vibration occurs in the high speed region engine.

U.S. Pat. Nos. 4,552,104 and 4,730,512 disclose methods to solve such problems of the V-type 6-cylinder internal combustion engine.

Force of the crankshaft acting on both of its ends influences the size of inertia couple. In the above method, dynamic balance on the whole crankshaft is effectively achieved by disposing balance weights on both of its ends, and dynamic balance between adjacent main bearings is achieved by disposing balance weight on the midmost crank arm.

However, the balance weight provided to the midmost crank arm just influences the dynamic balance between the adjacent main bearings, and does not influence the dynamic balance on the whole crankshaft. Thus, the dynamic balance on the whole crankshaft depends on each pair of the balance weights disposed on both the ends of the crankshaft, and the size of the balance weights must be large. When it comes to molding of the crankshaft, a die has an upper-and-lower separating line. In the case of the balance weight disposed on the midmost crank arm, the separating line is on an adjacent crank pin, and upper and lower dies move in a direction of the center of gravity of the balance weight. Accordingly, it is too hard to mold a proper size of the balance weight.

A crankshaft disclosed in Japanese unexamined Publication No. Sho 60-227037 has six balance weights aligned in line to each crank arm to have 60 degrees of its disposition angle, and the inertia couple may be thereby relieved.

The third and fourth balance weights disposed on the crank arms adjacent to the midpoint of the crankshaft contribute to the dynamic balance between adjacent main bearings and the dynamic balance of the whole crankshaft, as well. Since the second and fifth balance weights are provided to the third and seventh crank arms, moment arm is thereby short, and this technique is not effective. In conclusion, the first and sixth balance weights should be formed large.

SUMMARY OF THE INVENTION

It is an object of the present invention to provide a crankshaft of a V-type 6-cylinder internal combustion engine which ensures a decrease of the engine vibration and surface pressure affecting each crank journal by achieving effectively dynamic balance of a whole crank shaft and dynamic balance couple between inner main bearings with an optimum size of balance weight.

It is another object of the present invention to provide a crankshaft of a V-type 6-cylinder internal combustion engine which can promote productivity of a crankshaft as desired, especially, balance weights.

The crankshaft of a V-type 6-cylinder internal combustion engine of this invention including first to sixth crank pins connected with connecting rods, having first to fourth crank journals between the first to sixth crank pins, and first to ninth crank arms between first to sixth crank pins and the first to fourth crank journals, comprises:

a first balance weight provided to the first crank arm, the center of gravity of the first balance weight being mal-distributed to the lower part with respect to the center axis of the crankshaft;

a second balance weight provided to the second crank arm, the center of gravity of the second balance weight being mal-distributed to the lower part, and deviated from the first balance weight in a counterclockwise direction;

third and fourth balance weights provided respectively to the fourth crank arm and sixth crank arm and having centers of gravity deviated upward and downward and orthogonally in a clockwise direction with respect to the center of gravity of the first balance weight;

a fifth balance weight provided to the eighth crank arm, the center of gravity of the fifth balance weight being in vertical symmetry with the second balance weight; and a sixth balance weight provided to the ninth crank arm, the center of gravity of the sixth balance weight being mal-distributed to be in vertical symmetry with the first balance weight.

In addition, when viewed from the front of the crankshaft (FIG. 6), the first and sixth balance weights, and the second, third, fourth, and fifth balance weights maintain rotatory balance each other to equilibrate as a whole.

As another embodiment of this invention, one balance weight may be disposed between the third and fifth balance weights.

The inertia couple and unbalanced couple by balance weights can be offset by the disposition of such balance weights.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION OF THE PREFERRED EMBODIMENTS

Figure 1:
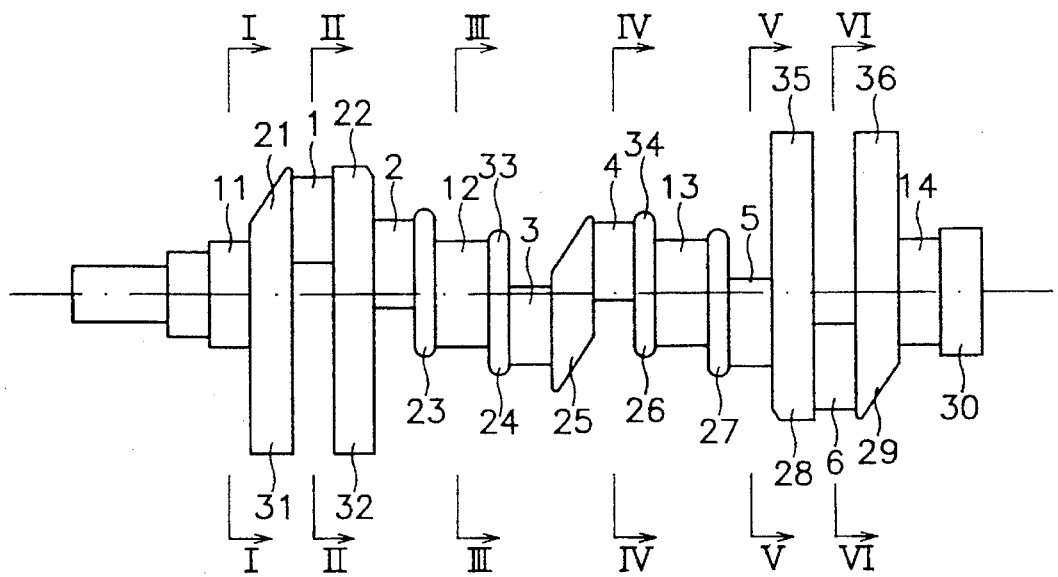
FIG. 1 is a side view of a crankshaft in accordance with a first preferred embodiment of the present invention.

FIG. 1 is a side view of a crankshaft in accordance with this invention, and reference numerals 1 to 6 designate first to sixth crank pins connected to connecting rods.

The pair of crank pins 1, 2 is arranged between first and second crank journals 11, 12, the pair of crank pins 3,4 are arranged between second and third crank journals 12, 13, and the pair of crank pins 5, 6 are arranged between third and fourth crank journals 13, 14.

First, second, third, fourth, fifth, sixth, seventh, eighth and ninth crank arms 21 to 29, respectively, are interposed between the first to sixth crank pins 1 to 6, respectively and the first to fourth crank journals 11 to 14. A flywheel (not illustrated) is connected to a flange 30 formed to be adjacent to the fourth crank journal 14.

In the crankshaft of the present invention, first and second balance weights 31, 32 are provided respectively to the first and second crank arms 21, 22 of the front end among the first to ninth crank arms 21 to 29, respectively.

The third and fourth balance weights 33, 34 are provided respectively to the midmost fourth and sixth crank arms 24, 26. The fifth and sixth crank arms 28, 29 of the rear end are provided with the fifth and sixth balance weights 35, 36.

Figure 2A:
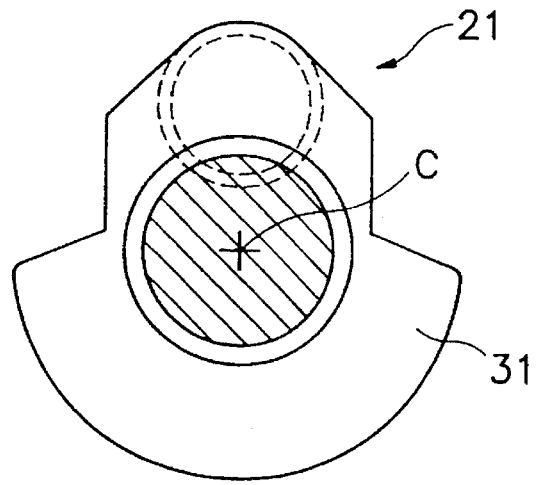
FIG. 2A is a sectional view taken along lines I—I of FIG. 1.
Figure 2B:
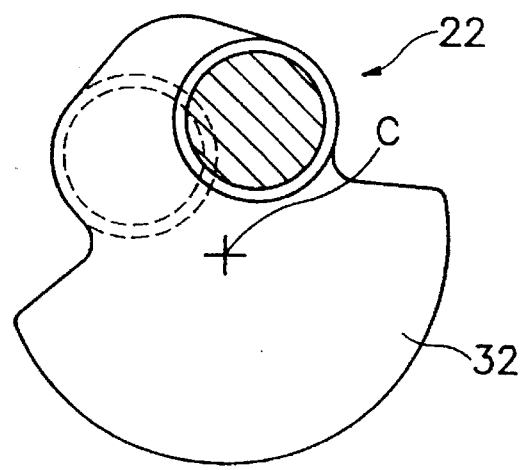
FIG. 2B is a sectional view taken along lines II—II of FIG. 1.

FIGS. 2A to 2F are sectional views of each part of the crankshaft. The center of gravity of the first balance weight 31 provided to the first crank arm 21 is mal-distributed to the lower part to the center axis C of the crankshaft. The center of gravity of the second balance weight 32 provided to the second crank arm 22 is mal-distributed to the lower part, as shown in FIG. 2B, and the second balance weight 32 is located to be offset by about an angle of 30 degrees in the counterclockwise direction from the first balance weight 31.

Figure 2C:
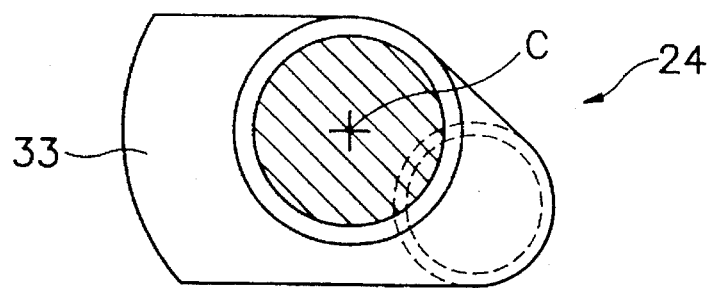
FIG. 2C a sectional view taken along lines III—III of FIG. 1.
Figure 2D:
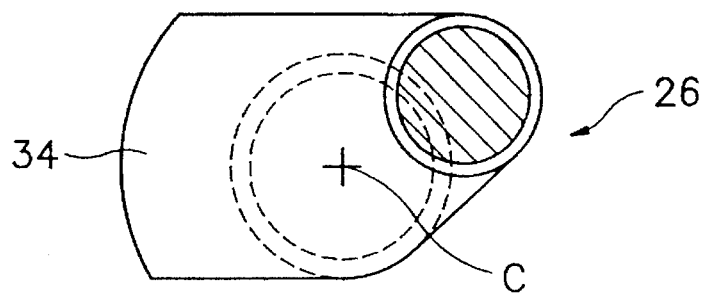
FIG. 2D is a sectional view taken along lines IV—IV of FIG. 1.
Figure 2E:
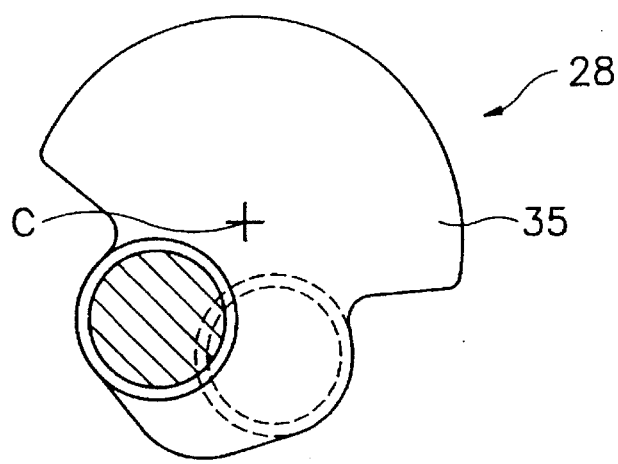
FIG. 2E is a sectional view taken along lines V—V of FIG. 1.
Figure 2F:
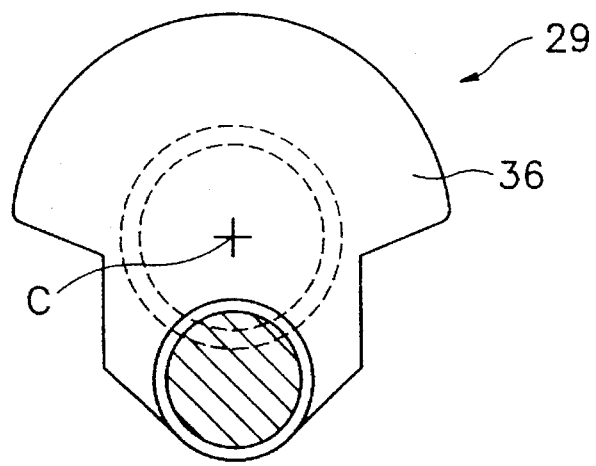
FIG. 2F is a sectional view taken along lines VI—VI of FIG. 1.

The third balance weight 33 provided to the fourth crank arm 24 and the fourth balance weight 34 provided to the sixth crank arm 26 are real-distributed upward and downward in a direction orthogonally to the left with respect to the center of gravity of the first balance weight 31, as shown in FIGS. 2C and 2D, and the center of gravity between them is in vertical symmetry. The fifth balance weight 35 provided to the eighth crank arm 28 is located in vertical symmetry with the second balance weight 32 as shown in FIG. 2E. The sixth balance weight 36 provided to the ninth crank arm 29 is located in vertical symmetry with the first balance weight 31, as shown in FIG. 2F.

Like the second balance weight 32, the fifth balance weight 35 is located to be deviated by about 30 degrees in the clockwise direction from the sixth balance weight 36. The first balance weight 31 and sixth balance weight 36, the second balance weight 32 and fifth balance weight 35, and the third balance weight 33 and fourth balance weight 34 are identical to and almost the same as each other in first moment of mass.

Accordingly, the first, second balance weights 31, 32 disposed on a first end of the crankshaft are in symmetry with the fifth and sixth balance weights 35, 36 disposed on a second end of the crankshaft. The midmost third and fourth balance weights 33, 34 are disposed upward and downward in a direction orthogonally to the first and second balance weights 31, 32, as shown in FIG. 3.

Figure 4:
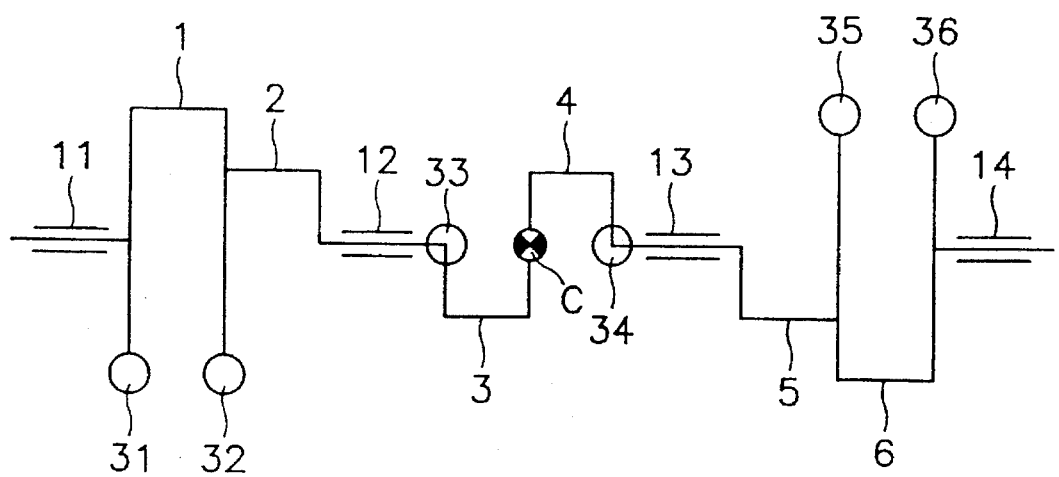
FIG. 4 depicts schematically the disposition of balance weights of FIG. 1.

The disposition of each balance weight 31 to 36 of FIG. 1 may be depicted in FIG. 4.

Thus, the first and sixth balance weights 31, 36, the second and fifth balance weights 32, 35, and the third and fourth balance weights 33, 34, are disposed respectively to be symmetrical to the center axis C of the crankshaft, and the third balance weight 33 is in symmetry with the fourth balance weight 34 with respect to the center axis of the crankshaft.

Figure 3:
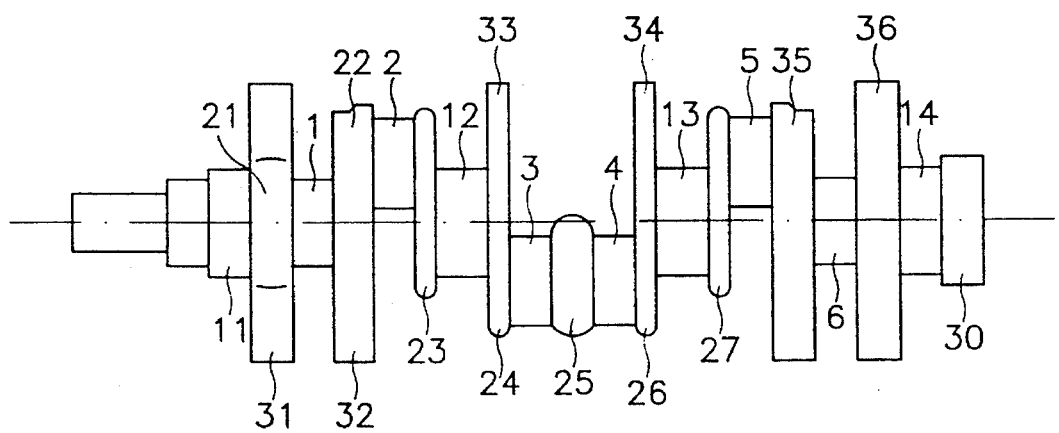
FIG. 3 is a plan view of the crankshaft in accordance with the first preferred embodiment of this invention.
Figure 5:
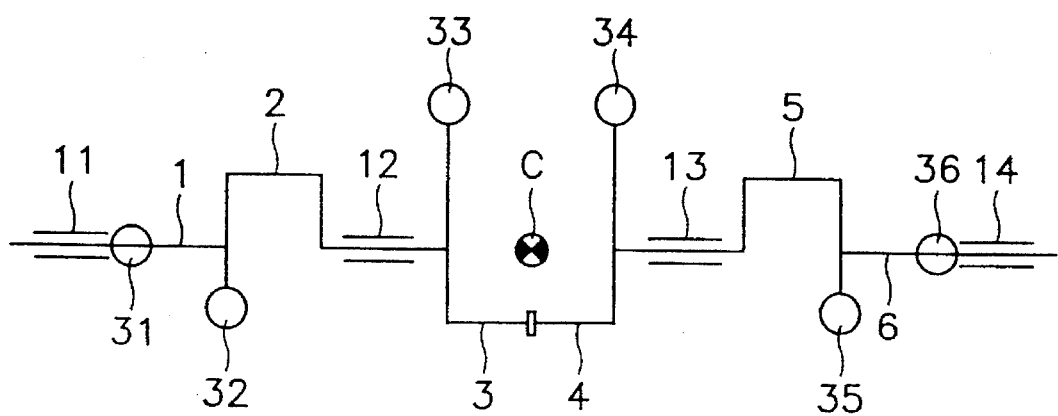
FIG. 5 depicts schematically the disposition of balance weights of FIG. 3.

What is depicted in FIG. 3 is obtained by rotating the structure in FIG. 1 by 90 degrees, and the disposition of the balance weights is changed, as shown in FIG. 5.

The first and sixth balance weights 31, 36, the second and fifth balance weights 32, 35, and the third and fourth balance weights 33, 34, are in symmetry with each other with respect to the center axis C.

Therefore, in the crankshaft of this invention, the balance weights are arranged in axial symmetry completely with respect to the center axis.

Figure 6:
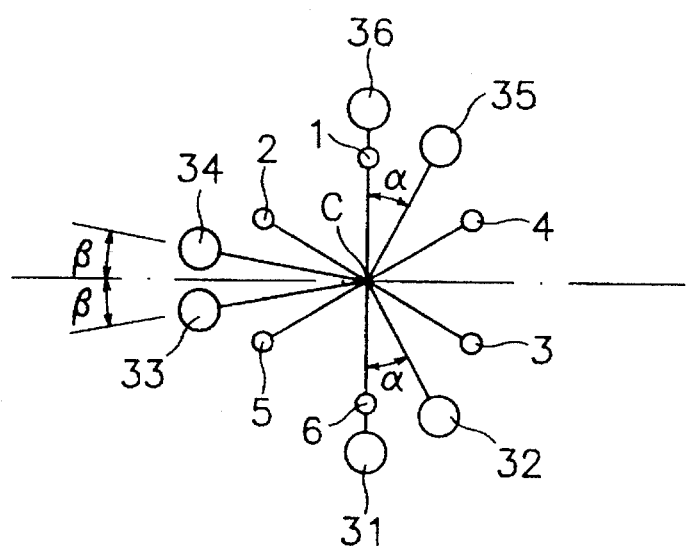
FIG. 6 depicts schematically the disposition of the balance weights of the first embodiment, centering around a center axis of the crankshaft.

FIG. 6 depicts the disposition of the first to sixth balance weights 31 to 36 with respect to the center axis C of the crankshaft.

The first and sixth balance weights 31 and 36 are in rectilinear symmetry with each other. The second balance weight 32 is disposed contrary to the crank pins 1, 2, with an angle α of ±30 degrees with respect to a line connecting the center of the crank pins 1 and 2 to the center axis C. The fifth balance weight 35 is disposed contrary to the crank pins 5, 6, with an angle α of ±30 degrees, with respect to a line connecting the center of the crank pins 5, 6 to the center axis C. The second balance weight 32 is in vertical symmetry with the fifth balance weight. The third and fourth balance weights 33, 34 are arranged in an opposite direction to the third and fourth crank pins 3, 4, and have an angle β of ±60 degrees with respect to the line connecting the center of the third and fourth crank pins with the center axis C.

An unbalanced couple around the center axis C in the structure appearing in FIG. 5 does not exist. That is, an unbalanced couple caused by rotation weight and turnaround weight is offset at the center axis, and the unbalanced couple due to the disposed balance weights is offset, too.

Figure 7:
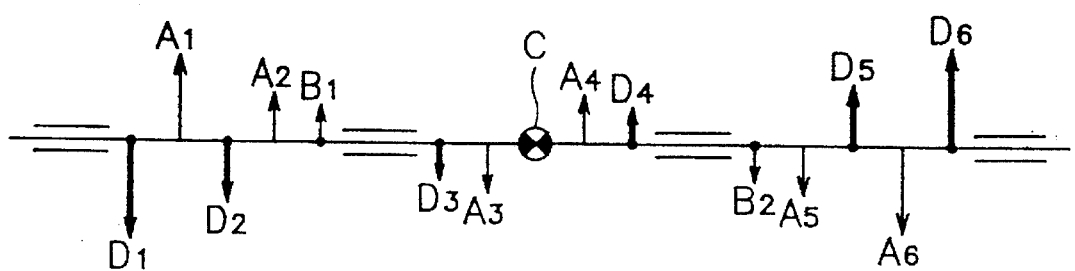
FIG. 7 depicts schematically the size of each centrifugal force of the balance weights as shown in FIG. 4.

However, when it comes to the unbalanced couple in the disposition as shown in FIG. 4, referring to FIG. 7, the unbalanced couple caused by rotation weight and turnaround weight occurs in a direction as indicated by arrows $A_1$ to $A_6$. An unbalanced couple by the crank arms without balance weights occurs in a direction as indicated by arrows $B_1$ and $B_2$, and the unbalanced couple by the balance weights is generated in a direction as indicated by arrows $D_1$ to $D_6$.

Thus, the couple produced with respect to the center axis C by arrows $A_1, A_6; A_2, A_5; A_3, A_4;$ and $B_1, B_2$ may maintain a balance due to the couple by arrows $D_1, D_6; D_2, D_5;$ and $D_3, D_4$.

FIG. 8 to FIG. 14 depict a crankshaft in accordance with a second preferred embodiment, and like reference numerals designate like parts throughout all the specification.

Each pair of first, second, third, fourth and sixth crank pins 1 through 6, respectively, is arranged between first to fourth crank journals 11 through 14, respectively.

First, second, third, fourth, fifth, sixth, seventh, eighth and ninth crank arms 21 through 29, respectively, are interposed between the first through sixth crank pins 1 through 6, respectively, and the first through fourth crank journals 11 through 14. A flywheel (not illustrated) is provided on a flange 30 formed to be adjacent to the fourth crank journal 14.

In the crankshaft of the present invention, first and second balance weights 31, 32 are provided respectively to the first and second crank arms 21, 22 of the front end of the crankshaft among the first to ninth crank arms 21 through 29. The third, fourth and fifth balance weights 33, 34, 35 are provided respectively to the midmost fourth, fifth, sixth crank arms 24, 25, 26. The fifth and sixth crank arms 28, 29 of the rear end of the crankshaft are provided with the fifth and sixth balance weights 36, 37.

Figure 9A:
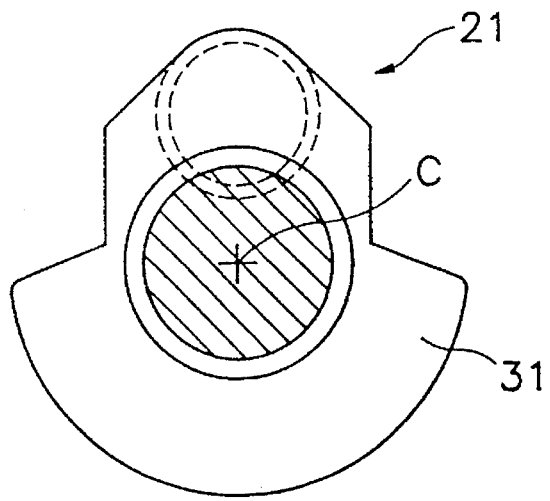
FIG. 9A is a sectional view taken along lines I—I of FIG. 8.
Figure 9B:
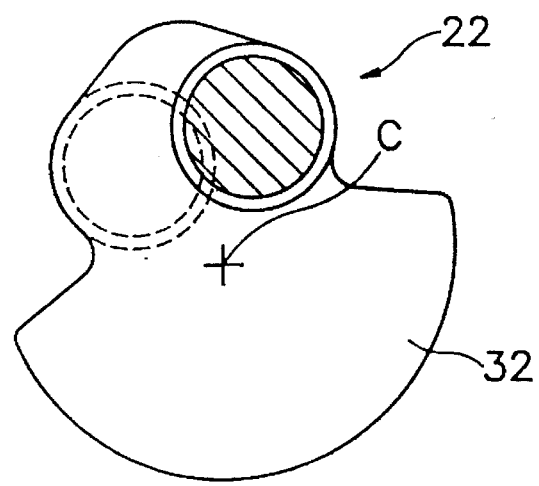
FIG. 9B is a sectional view taken along lines II—II of FIG. 8.

FIG. 9A to 9G are sectional views of each part of the crankshaft. The center of gravity of this first balance weight 31 provided to the first crank arm 21 is mal-distributed to be lower than the center axis C of the crankshaft. The center of gravity of the second balance weight 32 provided to the second crank arm 22 is mal-distributed to the lower part, as shown in FIG. 9B, and the second balance weight 32 is located to be deviated by about 30 degrees in the counter-clockwise direction from the first balance weight 31.

Figure 9C:
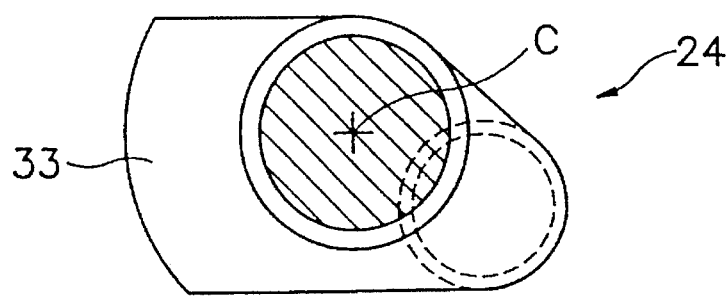
FIG. 9C is a sectional view taken along lines III—III of FIG. 8.
Figure 9D:
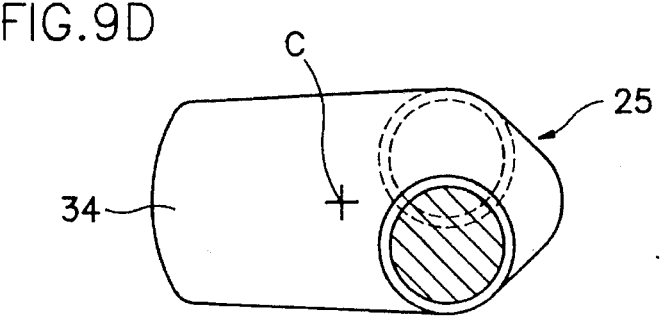
FIG 9D is a sectional view taken along lines IV—IV of FIG. 8.
Figure 9E:
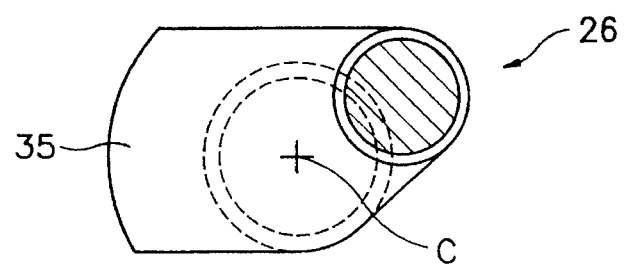
FIG. 9E is a sectional view taken along lines V—V of FIG. 8.

The third balance weight 33 provided to the fourth crank arm 24 and the fourth and fifth balance weights 34, 35 provided to the fifth and sixth crank arms 25, 26 are located orthogonally to the left with respect to the center of gravity of the first balance weight 31, as shown in FIGS. 9C, 9D and 9E, and the center of gravity between them is in vertical symmetry. The center of gravity of the fifth balance weights 35 is located in vertical symmetry with that of the third balance weight 33.

The center of gravity of the fourth balance weight 34 is located on around the midpoint between the third and fifth balance weights 33, 35.

Figure 9F:
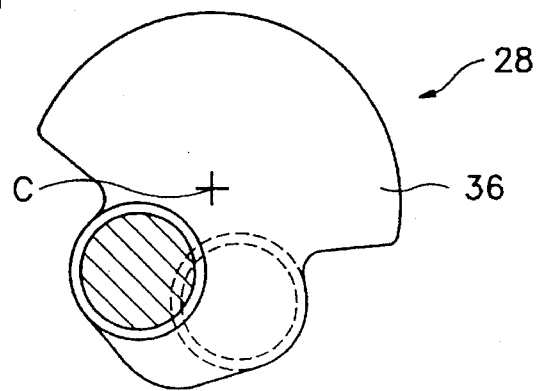
FIG. 9F is a sectional view taken along lines VI—VI of FIG. 8.
Figure 9G:
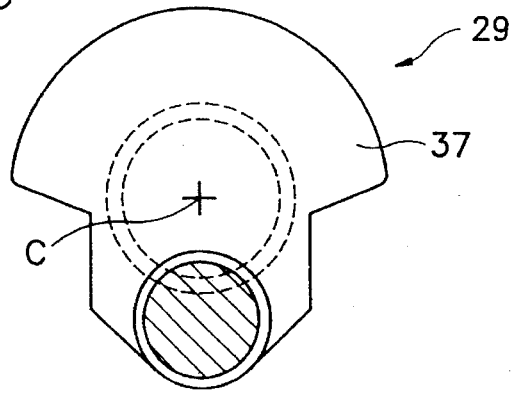
FIG. 9G is a sectional view taken along lines VII—VII of FIG. 8.

The sixth balance weight 36 provided to the eighth crank arm 28 is in vertical symmetry with the second balance weight 32, as shown in FIG. 9F. The seventh balance weight 37 provided to the ninth crank arm 29 is in vertical symmetry with the first balance weight 31, as shown in FIG. 9G.

The sixth balance weight is disposed to be deviated by about 30 degrees in clockwise direction with respect to the seventh balance weight 37, like the second balance weight 32.

The first balance weight 31 and seventh balance weight 37, the second balance weight 32 and sixth balance weight 36, and the third balance weight 33 and fifth balance weight 35 are identical to, or the same as each other in first moment of mass. The fourth balance weight 34 has first moment of mass that maintains a balance with the second, third, fifth and sixth balance weights 32, 33, 35, 36.

Accordingly, the first and second balance weights 31, 32 disposed on a first end of the crankshaft are in symmetry with the sixth and seventh balance weights 36, 37 disposed on a second end of the crankshaft. The midmost third, fourth and fifth balance weights 33, 34, 35 are vertically disposed to be orthogonal left to the line of center of gravity between first and second balance weights 31, 32, as shown in FIG. 10.

Figure 8:
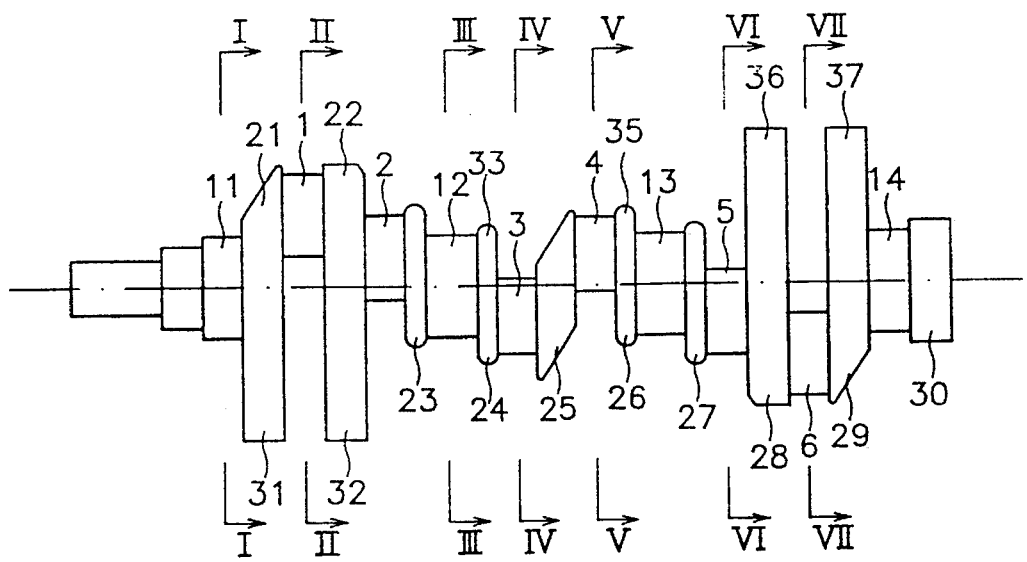
FIG. 8 is a side view of a crankshaft in accordance with a second preferred embodiment of the present invention.
Figure 11:
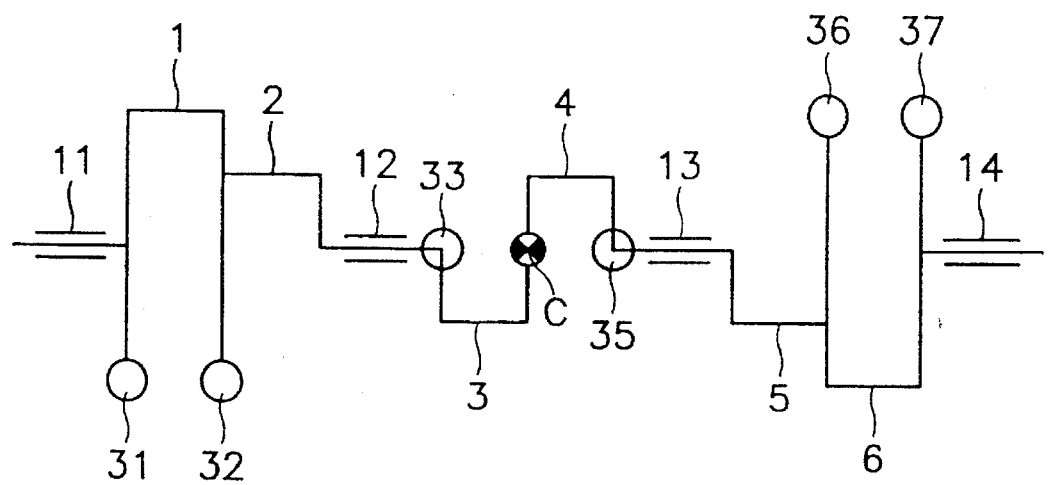
FIG. 11 depicts schematically the disposition of balance weights of FIG. 8.

The disposition of each balance weight 31 through 37 of FIG. 8 may be depicted in FIG. 11.

The first and sixth balance weights 31, 36, the second and fifth balance weights 32, 35, and the third and fourth balance weights 33, 34, are disposed respectively to be symmetrical to the center axis C of the crankshaft, and the third balance weight 33 is in symmetry with the fourth balance weight 34 with respect to the center axis of the crankshaft.

Figure 10:
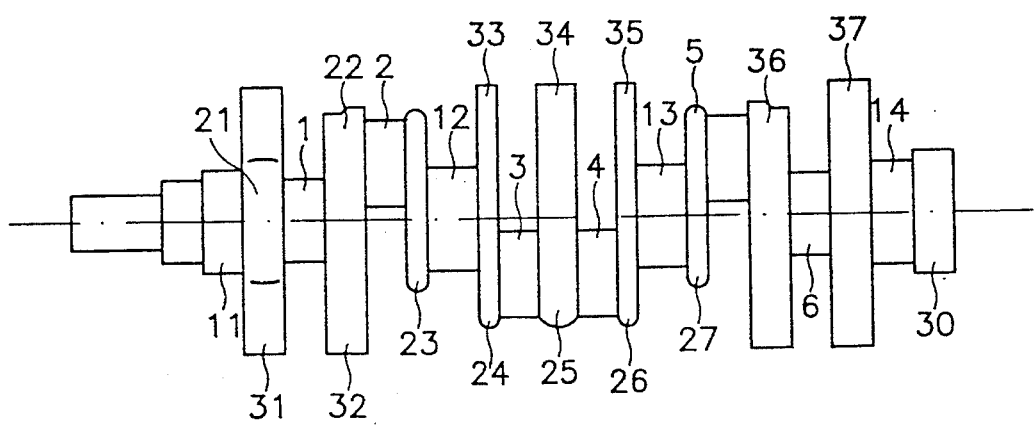
FIG. 10 is a plan view of the crankshaft in accordance with the second preferred embodiment of this invention.
Figure 12:
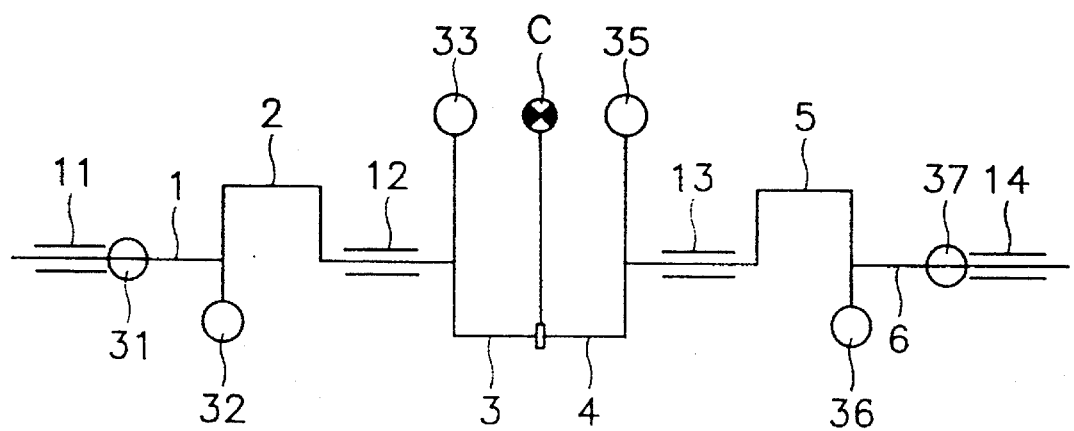
FIG. 12 depicts schematically the disposition of balance weights of FIG. 10.

What is depicted in FIG. 10 is obtained by rotating the structure in FIG. 8 by 90 degrees, and the disposition of the balance weights is changed as shown in FIG. 12.

The first and sixth balance weights 31, 36, the second and fifth balance weights 32, 35, and the third and fourth balance weights 33, 34, are in symmetry with each other with respect to the center axis C.

Therefore, in the crankshaft of this invention, the balance weights are arranged in axial symmetry with respect to the center axis.

Figure 13:
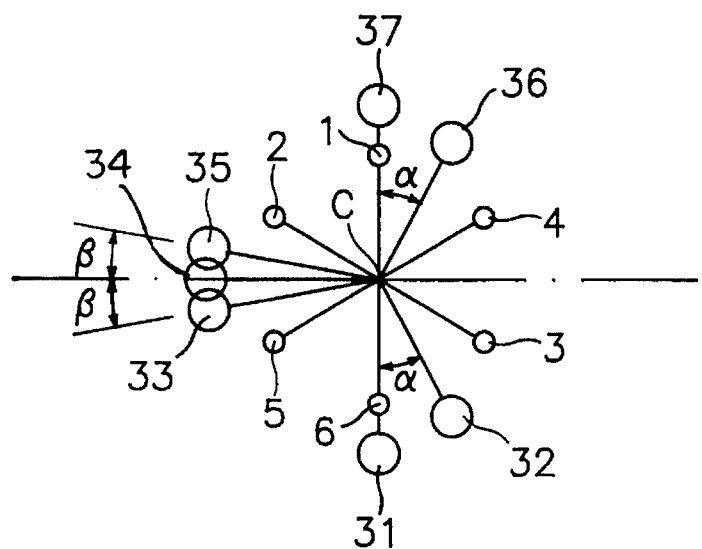
FIG. 13 depicts schematically the disposition of the balance weights of the second embodiment, centering around a center axis of the crankshaft.

FIG. 13 depicts the disposition of the first through seventh balance weights 31 through 37 with respect to the center axis C of the crankshaft.

The first and seventh balance weights 31 and 37 are in rectilinear symmetry with each other. The second balance weight 32 is disposed contrary to the crank pins 1, 2, with an angle α of ±30 degrees with respect to a line connecting the center of the crank pins 1 and 2 to the center axis C. The fifth balance weight 35 is disposed contrary to the crank pins 5, 6, with an angle α of ±30 degrees, with respect to a line connecting the center of the crank pins 5, 6 to the center axis C.

An unbalanced couple around the center axis C in the structure appearing in FIG. 12 does not exist. That is, an unbalanced couple caused by rotation weight and turnaround weight is offset at the center axis, and the unbalanced couple due to the disposed balance weights is offset, too.

Figure 14:
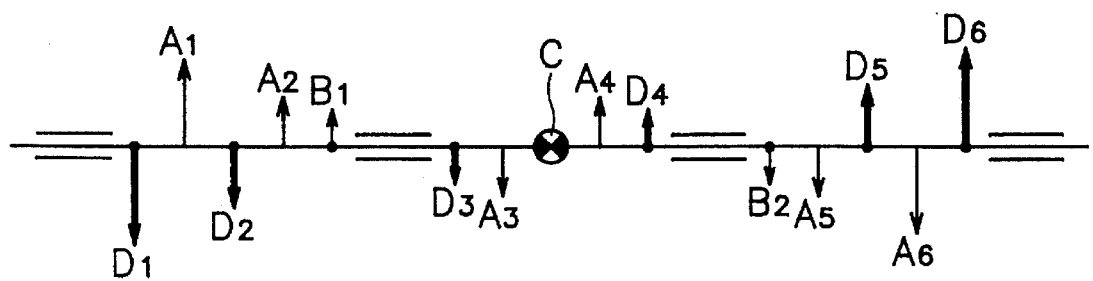
FIG. 14 depicts schematically the size of each centrifugal force of the balance weights as shown in FIG. 11.

However, when it comes to the unbalance couple in the disposition as shown in FIG. 11, referring to FIG. 14, the unbalanced couple caused by rotation weight and turnaround weight occurs in a direction as indicated by arrows $A_1$ to $A_6$. The unbalanced couple by the crank arms occurs in a direction as indicated by arrows $B_1$ and $B_2$, and the unbalanced couple by the balance weights is generated in a direction as indicated by arrows $D_1$ to $D_6$.

Thus, the couple produced with respect to the center axis C by arrows $A_1, A_6$; $A_2, A_5$; $A_3, A_4$; and $B_1, B_2$ may maintain a balance due to the couple by arrows $D_1, D_6$; $D_2, D_5$; and $D_3, D_4$.

The present invention makes it possible to offset an inertia couple produced from the crankshaft and achieve effectively dynamic balance of a whole crank shaft and dynamic balance couple between inner main bearings with an optimum size of balance weight.

What is claimed is:

1. A crankshaft of a V-type 6-cylinder internal combustion engine including first to sixth crank pins connected with connecting rods, having first to fourth crank journals between said first to sixth crank pins, and first to ninth crank arms between first to sixth crank pins and the first to fourth crank journals, the combination therewith comprising:

a first balance weight provided to said first crank arm, a center of gravity of said first balance weight being initially mal-distributed to a lower part of said first crank arm with respect to a center axis of the crankshaft;

a second balance weight provided to said second crank arm, a center of gravity of said second balance weight being initially mal-distributed to a lower part of said first crank arm, and offset from said first balance weight in a counterclockwise direction, wherein the center of gravity of said second balance weight is formed to be offset by 30 degrees in a counterclockwise direction from said first balance weight;

third and fourth balance weights provided respectively to said fourth crank arm and sixth crank arm, with centers of gravity of said third and fourth balance weights being initially mal-distributed to be offset from said first balance weight in a clockwise direction;

a fifth balance weight provided to said eighth crank arm, a center of gravity of said fifth balance weight being initially mal-distributed to be in vertical symmetry with said second balance weight; and a sixth balance weight provided to said ninth crank arm, a center of gravity of said sixth balance weight being initially mal-distributed to be in vertical symmetry with said first balance weight, and wherein said fifth crank arm is free of a balance weight.

2. The crankshaft as set forth in claim 1, wherein said first balance weight and sixth balance weight are identical to each other in weight, configuration and section modulus.

3. The crankshaft as set forth in claim 1, wherein said second balance weight and fifth balance weight are identical to each other in weight, configuration and section modulus.

4. The crankshaft as set forth in claim 1, wherein said third balance weight and fourth balance weight are identical to each other in weight, configuration and section modulus.

* * * * *